Patented Jan. 5, 1954

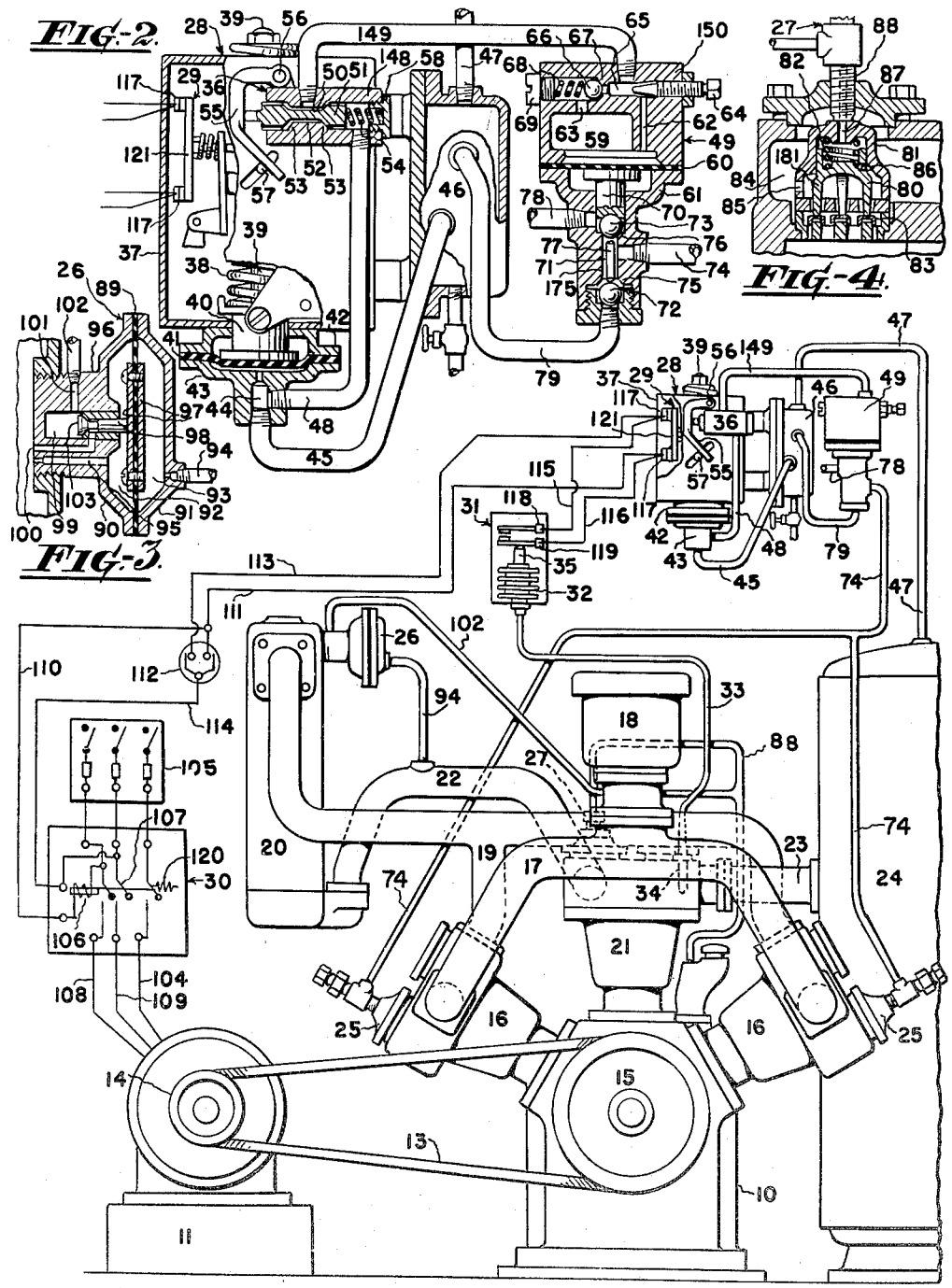

2,665,053

UNITED STATES PATENT OFFICE 2,665,053

DUAL AUTOMATIC CONTROL FOR COMPRESSORS

Paul A. Bancel, Montclair, N. J., assignor to Ingersoll-Rand Company, New York, N. Y., a corporation of New Jersey Application July 20, 1949, Serial No. 105,781

10 Claims. (Cl. 230—4)

1

This invention relates to a dual automatic control for compressors and more particularly to a control for automatically selecting the most economical means of controlling the load or output of the gas compressor for any given load condition.

At the present time there are several well known methods of controlling the output of a gas compressor in accordance with the discharge pressure of the compressor. One method is to load and unload the compressor by means of relief or by-pass valves in accordance with lower and upper predetermined pressure values. This loading and unloading is performed without altering the speed of the motor driving the compressor and for this reason this type of load control is commonly known as "constant-speed" control.

In another type of control, commonly known as "start-stop" control, the loading and unloading phase is similar to that previously described. However, in this type of control, the motor for driving the compressor is shut down simultaneously with the unloading of the compressor and subsequently started just prior to loading of the compressor.

Each of the foregoing types of load control operate more effectively under a different set of load circumstances and accordingly it is desirable to have one type of control operate under one set of load conditions and the other type of control to operate under another set of circumstances. Specifically, under heavy load conditions it is generally desirable to operate with the "constant-speed" type of control whereas when the demand on the compressor is relatively low—that is, when the compressor is operating at a lower percentage of its capacity, it is normally desirable to utilize the "start-stop" control. The reason for this lies in the economy of power consumption. For any given motor-compressor unit there is a fixed cost of accelerating the motor from stand still to rated, or normal speed, and, of course, for the same cost there is a given time which the motor will drive the unloaded compressor at constant speed—this latter time exceeds the former due to the increased power consumption in accelerating the motor. Accordingly, whenever the load conditions on the compressor are such that the cost or power consumption of operating the compressor unloaded at constant speed exceeds that of starting and stopping the motor, it would be more desirable to operate with the "start-stop" control. Conversely, when the compressor operates unloaded for only relatively short periods

2 the "constant-speed" type of control would be more advantageous.

It is apparent from the foregoing discussion then, that this point of changeover from "start-stop" control to "constant-speed" control for any given motor-compressor unit is fixed. Accordingly, for any given system—depending in part upon the volume of the receiver as will be explained hereinafter—there is a fixed percentage demand on the compressor at which this changeover should occur for most economical operation of the unit. It is, accordingly, one object of this invention to automatically control the selection of the most economical type of load control in accordance with the load demand on the compressor.

It is another object of this invention to provide a dual automatic control for selecting the most economical type of control by means of a device responsive to thermal changes which vary directly in accordance with the percentage demand on the compressor.

A further object of this invention is to automatically control the selection of the type of control for the compressor in accordance with the temperature of the compressor.

Still further objects of the invention will become apparent from the following specification and accompanying drawing in which, Figure 1 is an end elevation of a compressor and associated load control apparatus, Fig. 2 is an enlarged view, partly in section, of the controller and associated valves, shown in Figure 1, for unloading the compressor, Fig. 3 is a sectional elevation of the intercooler relief valve shown in Figure 1, and Fig. 4 is a sectional elevation of a relief valve for unloading the high pressure cylinder of the compressor.

Referring to Figure 1, the dual automatic control is shown adapted to a motor-compressor unit including a conventional air cooled gas compressor 10 driven by an electric motor 11 through a belt 13 encircling pulleys 14 and 15 on the motor 11 and compressor 10, respectively. The compressor 10 includes a pair of low pressure cylinders 16 which receive air through an intake manifold 17 connected to a filter 18. Air compressed in the low pressure cylinders is conducted through a discharge pipe 19 to an intercooler 20 from whence the compressed air is conveyed to a high pressure cylinder 21 by a pipe 22. Air discharged from the high pressure cylinder 21 passes through line 23 to a receiver 24.

In accordance with the practice of the invention, the compressor 10 is provided with means for loading and unloading the compressor at predetermined lower and upper discharge pressures of the compressor. In the embodiment shown, this means includes free air unloader valves 25, of any conventional construction, mounted on the low pressure cylinders 16 for unloading the cylinders by communicating them with the atmosphere; and an intercooler relief valve 26 and a high pressure relief valve 27 operate automatically in connection with the unloader valves 25 to exhaust, respectively, the intercooler 20 and the high pressure cylinder 21.

In furtherance of the operation of the unloader valves in accordance with the conditions aforesaid, there is provided a fluid pressure actuated controller designated, in general, by 28 which is at all times communicated with the discharge pressure of the compressor and is actuated in response thereto. With this arrangement, whenever the discharge pressure reaches a predetermined upper value, the controller 28 is actuated to operate the unloader valves 25 thereby unloading the low pressure cylinders 16. With the unloading of the low pressure cylinders 16, the intercooler relief valve 26 and the high pressure relief valve 27 relieve the pressure in that portion of the system with which they are associated. This arrangement, then, provides "constant-speed" control of the compressor in accordance to the discharge pressure.

"Start-stop" control of the compressor is obtained through a means provided for starting and stopping the motor at predetermined lower and upper discharge pressures of the compressor—in this instance the predetermined lower and upper pressures are the same as those which operate the controller 28 for unloading the cylinders 16. In the preferred embodiment of the invention illustrated, this means includes an electrical switch, designated in general by 29, which is actuated by the controller 28 for making and breaking the electrical circuit in which the motor 11 is connected. Specifically, when the controller 28 is actuated at said predetermined upper pressure value to unload the cylinders 16, the electrical switch 29 is simultaneously opened thereby breaking the electrical circuit—through means of a magnetic controller 30—through which power is supplied to the motor 11, thereby simultaneously causing the motor to shut down and the compressor 10 to be unloaded.

It is to be noted that with the control arrangement set forth that only "start-stop" control is available unless some means is provided to select the desired type of load control. In furtherance to this end, a thermostat, or thermal responsive means, is provided for preventing control of the motor by the "start-stop" control whenever the percentage demand (percentage of the full load capacity of the compressor 10) on the compressor exceeds a predetermined value.

In the preferred embodiment shown, this means includes a thermal actuated electrical switch 31 connected in parallel with the electrical switch 29 and actuated by a unit responsive to variations in temperature of some portion of the motor-compressor unit. This variation in temperature reflects directly the time the compressor runs loaded or, in essence, the percentage load on the compressor. In other words, the longer the compressor runs loaded and the shorter the unloaded period—a condition of high percentage load—the higher will be the mean temperature of the motor and compressor and, incidentally, the greater the range in temperature variations. The converse also occurs. Thus, by the provision of the said thermal responsive unit for measuring the percentage load on the compressor as it is reflected in temperature variations, the more efficient method of load control can be selected automatically in a manner to be set forth in detail hereinafter.

The thermal responsive means illustrated includes a mechanism 32 connected by a capillary tube 33 to a bulb 34 which may be positioned at any point on the motor-compressor unit whereat temperature variations occur in accordance with changes in load conditions. The greater the thermal change, the less sensitive need be the thermal means, and for this reason the bulb 34 is preferably located at a point adjacent or in the discharge portion of the high pressure cylinder 21.

The bulb 34 is filled with a fluid or other medium having a high co-efficient of thermal expansion which, by virtue of this expansion, the mechanism 32 is actuated to move a plunger 35 to close or open, as the case may be, the switch 31. The switch actuating mechanism 32 may be of any conventional type and preferably has a snap action so that the switch 31 remains closed over some predetermined range of temperature of the cylinder 21.

With this arrangement, as set forth, it becomes clear that through the coaction and inner action of the various control elements, the "start-stop" control, the "constant-speed" control and the thermostatic control, there is automatic selection of the type of control for the most efficient operation of the compressor for any condition of loading. That is, due to the loading and unloading of the compressor, the temperature of the various parts of the compressor will fluctuate between certain temperature limits in the manner aforesaid. Accordingly, the thermal responsive means may be set for any predetermined temperature range, to be explained in greater detail hereinafter, so that when the compressor is running at a load, or percentage demand, in excess of some predetermined value such that "constant-speed" control is desirable, the switch 31 will be closed by the plunger 35 to prevent control of the operation of the motor 11 by the pressure actuated switch 29. Specifically, inasmuch as the switch 31 is in parallel with the switch 29, whenever the switch 31 is closed, the operation of the switch 29 will not in any way affect the flow of current to the motor 11.

Conversely, when the percentage demand on the compressor 10 falls below the aforesaid predetermined value, the temperature of the compressor will have fallen below the lower limit of said predetermined temperature range and the switch 31 will be opened by the mechanism 32 thereby permitting "start-stop" control of the motor 11. That is, with the switch 31 open, opening of the electrical switch 29 interrupts the flow of power to the motor 11 and closing the electrical switch 29 completes the circuit in which the motor 11 is connected.

Thus, it will be seen that the thermal operated switch 31 acts as a means for selecting the most desirable type of control of the compressor 10. Whenever the load demand on the compressor 10 is such that "constant-speed" control is desirable, the switch 31 prevents the operation of the "start-stop" control, and whenever this load demand falls to a point where the "start-stop" control is the most desirable means of controlling the compressor, then the switch 31 permits the operation of the "start-stop" control.

Referring more particularly to the means for controlling the loading and unloading of the compressor 10, the controller 28 may be of any conventional form of controller which is responsive to fluid pressure for actuating other control members, such as a three-way release valve 36 and the electrical switch 29, snap action of the switch 29 being preferred. The controller, shown for the sake of illustration, includes a casing 37 housing the switch 29 and a spring 38 held in position by a bolt 39 which also serves to adjust the tension on the spring 38. The lower end of the spring 38, as viewed in Figure 2, rests on a plunger 40 which, in turn, bears on a diaphragm 41 clamped between upper and lower flanged members 42 and 43, respectively.

The upper member 42 is secured to the lower end of the casing 37 and the member 43 is secured at its flanged portion to member 42. A central passage 44 in the lower member 43, serves to conduct pressure fluid to the lower surface of the diaphragm 41 from a scale trap 46 connected to the passage 44 by a pipe 45. The trap 46, in turn, is communicated with the receiver 24 by means of a pipe 47. Also connected in the lower member 43 is a pipe 48 communicated at its other end with the three-way release valve 36 which controls the flow of pilot fluid to a second three-way valve, designated in general by 49, through which pressure fluid is supplied to and exhausted from the free air unloader valves 25.

The release valve 36 is of a known type and, in this instance, includes a valve casing 148 through which extends a longitudinal passage 50 for housing the valve 51. At an intermediate portion of the passage 50 is a shoulder 52 which provides at its opposite ends, seats 53 for the valve 51. Movement of the valve 51 in one direction is facilitated by means of a spring 54 biased between one end of the valve 51 and a plug 58 threaded in the end of the passage 50, and in the other direction by a lever 55 which bears at an intermediate portion thereof against the opposite end of the valve 51. The lever 55 is fulcrumed at 56 and the other end of the lever 55 bears on a pin 57 whereby movement of the plunger 40 in response to changes of pressure in the receiver 24 are transmitted to the lever 55 for actuating the valve 51.

The release valve 36, as was previously mentioned, serves to control the flow of pilot fluid to the three-way valve 49 and to this end, a pipe 149 is connected at one end in the casing 150 of the valve 49 and at its other end with a portion of the passage 50 intermediate the seats 53. The passage 50 is communicated at one end with the pipe 48 and at its opposite end with the atmosphere. With this arrangement, whenever the valve 51 is biased in the one direction—to the right as viewed in Figure 2—against the pressure of the spring 54 by the lever 55, communication is established between the pipe 48 and the pipe 149 thereby valving pressure fluid to the three-way valve 49.

Reverse movement of the valve 51 occurs whenever fluid pressure exerted on the diaphragm 41 falls below some predetermined value, then the plunger 40 and pin 57 are moved downwardly by the spring 38 thereby releasing the lever 55 to permit the spring 54 to bias the valve 51 into its other limiting position. In this position, communication is cut off between the pipes 48 and 149, and the pipe 149 is communicated with the atmosphere thereby exhausting pressure fluid from the valve 49.

The pressure fluid, the flow of which is controlled by the release valve 36, is in effect pilot fluid for actuating a conventional three-way valve 49 which, in turn, controls the flow of pressure fluid to the unloader valves 25. The three-way valve 49 in the preferred form shown is of the delayed action type and, further, is capable of handling a large volume of air in a relatively short time in order to facilitate fast action of the valves 25. To this end, the valve 49 illustrated is provided with a chamber 59 exposed to a diaphragm 60 clamped between the casing 150 and a valve housing 61. The chamber 59 is communicated through a passage 62 and a hole 63 with a transverse passage 65 in the casing 150; and the passage 65, in turn, is communicated at an intermediate portion thereof with the pipe 149 leading to the three-way release valve 36. The flow of pressure fluid through the passage 62 is controlled by a metering pin 64 threaded in the passage 65 and overlying an end of the passage 62, whereas the flow of pressure fluid from the passage 65 through the hole 63 into the chamber 59 is controlled by a one way ball valve 66 held against a seat 67 encircling the passage 65 by a spring 68 biased between the ball 66 and a set screw 69 threaded in the end of the passage 65.

With this particular arrangement then, the aforesaid preferred delayed action may be attained. Specifically, pressure fluid may escape from the chamber 59 only through the passage 62. The rate at which the pressure drops within the chamber 59 is, therefore, dependent on, or controlled by, the setting of the metering pin 64. Thus, the operation of the valve 49 in response to a drop in pressure in the chamber 59 may be delayed any desired length of time and, accordingly, the loading of the compressor may be delayed until such time as the motor 11 comes up to speed. Conversely, however, the unloading of the compressor may be obtained substantially instantaneously in response to a pressure change in that the pressure fluid may flow into the chamber 59, not only through the relatively small passage 62, but also through the large hole 63 so that the pressure within the chamber 59 is increased in a relatively short time whenever the valve 36 permits the flow of pressure fluid to the valve 49.

This variation in pressure within the chamber 59 is utilized to control the flow of pressure fluid to the compressor valves 25 through the means of a plunger 70 bearing against the lower surface of the diaphragm 60 and slidable in a longitudinal passage 71 in the housing 61. The reciprocating movement of the plunger 70 in response to variations in pressure in the chamber 59 is, in turn, transmitted to balls 72 and 73 which control, respectively, the flow of pressure fluid to and from the unloader valves 25 through a pipe 74.

A shoulder 175 formed in the passage 71 provides at its opposite end surfaces valve seats 75 and 76 for the balls 72 and 73, respectively. A pin 77 is interposed between the balls 72 and 73 so that whenever the ball 73 is forced onto its seat 76, the ball 72 is forced from its seat 75 and communication is cut off between the pipe 74, in communication with a portion of the passage 71 intermediate the ball 72 and 73, with a vent 78 communicated with the passage 71 at a point inwardly of, or above, the seat 76. In this valve position, however, communication is established between the pipe 74 and a pipe 79 threaded in the lower, or outwardly, end of the passage 71 and communicated at its opposite end with the scale trap 46. In this valve position then, pressure fluid is valved to the unloader valves 25 to unload the compressor 10.

Whenever the pressure within the chamber 59 falls below some predetermined value, the fluid pressure exerted on the ball 73 moves the plunger 70 upwardly, as viewed in Figure 2, thereby permitting the ball 72 to move onto its seat 75, cutting off communication between the pipes 79 and 74, and the unloader valves are exhausted through the vent 78 thereby loading the compressor 10.

The high pressure relief valve 27 and the intercooler relief valve 26 which operate automatically in response to falling pressure within the system resulting from the unloading of the compressor through the unloader valves 25, are of any well known type similar to those illustrated in Figures 4 and 3, respectively. The high pressure relief valve 27, illustrated in Figure 4, includes a spring actuated plunger 80 slidable in a casing 81. Extending from the lower end of the plunger 80 are fingers 181 which, when the plunger moves inwardly under the force of a spring 82, force valve members 83 open so as to exhaust the high pressure cylinder 21 through an orifice 86 in the plunger 80 and thence through an opening 87 in the outer end of the casing 81 to a pipe 88 connected to the atmosphere through the filter 18.

The casing 81 is housed within the inlet 84 of the high pressure cylinder and is exposed to fluid pressure therein through an opening 85 in the casing 81 so that whenever the pressure within the inlet 84 reaches some predetermined upper value, the fluid pressure acting on the lower surface of the plunger 80 moves it outwardly against the pressure of the spring 82. This movement releases the valve members 83, and the orifice 86 is shut off from communication with the high pressure cylinder by the surface of the casing 81 thereby loading the cylinder 21.

The intercooler relief valve 26 is also actuated in response to a change in pressure conditions within the system resulting from the loading and unloading of the low pressure cylinders and may be of any conventional type acting in response to a differential in pressure. In the preferred form shown, the valve 26 is of the diaphragm operated type with the opposite sides of the diaphragm exposed to the upstream and downstream ends of the intercooler 20.

In furtherance to this end, a diaphragm 89 has its marginal portions clamped between flange members 90 and 91 which form, respectively, pressure chambers 92 and 93 on the opposite sides of the diaphragm 89. The chamber 93 is communicated, in this instance, through a conduit 94 with the pipe 22 connected to the downstream end of the intercooler 20, whereas the chamber 92 is communicated with the upstream end of the intercooler 20 through a passage 95 formed in the base 96, of the member 90, threaded in the casing of the intercooler 20. With this arrangement a slight difference in pressure will exist between the chambers 92 and 93 whenever there is a flow of pressure fluid through the intercooler 20—due to the pressure drop caused by friction—and, of course, whenever flow through the intercooler 20 ceases, the pressure between these chambers will equalize.

This variation in the pressure differential between the chambers 92 and 93 is utilized to actuate a valve 103 to exhaust the intercooler 20 whenever the unloader valves 25 operate to unload the compressor 10. Accordingly, plates 97 are clamped on the opposite sides of the diaphragm 89 and the stem 98 of the valve 103 extends from the inner plate 97 into a longitudinally disposed recess, or chamber, 99 formed in the base 96. Communication between the atmosphere and the interior of the intercooler 20 through the chamber 99 is established by means of a pair of passages 100 and 101 formed in the base 96 and communicated, respectively, at their outer ends with the intercooler 20 and the atmosphere—the passage 101 being connected to the filter 18 by means of a conduit 102.

The inner ends of the passages 100 and 101 terminate in the chamber 99 and are arranged with respect to the valve 103 so that whenever the pressures within the chambers 92 and 93 are equal, the valve 103 permits pressure fluid to flow from the intercooler 20 through the passage 100, the chamber 99 and thence to the atmosphere through the passage 101. Conversely, whenever the pressure within the chamber 92 exceeds the pressure that exists within the chamber 93, the valve 103 vuts off this communication of the intercooler with the atmosphere.

Referring in greater detail to the electrical circuit and associated devices which cooperate with the loading and unloading devices for the compressor in order to attain the more effective mode of load control for a given load condition, the magnetic controller 30 connected between a power supply switch 105 and the motor 11, may be of any conventional design and is shown, for the sake of example, in one of its simplest forms—namely, a solenoid switch 106 for controlling the power supply to the motor 11. Power is supplied to the motor 11 through leads 104, 108, and 109 connected between the motor terminals and the switch 105, and solenoid 106 serves to operate a three pole switch 107 connected in the leads.

The coil of the solenoid 106 is in series in a lead 110 connected between the power, or hot, side of the switch 107 and a lead 111 connected between a contact 117 of electrical switch 29 and a three-way manually operated pilot control switch 112. A second conduit or lead 113 is connected between another contact on the switch 112 and the other contact 117 of switch 29, and the third contact on the control switch 112 is connected to lead 109 by a lead 114.

The thermal actuated switch 31 is connected in parallel with switch 29 by leads 115 and 116 connected to the contacts 117 and at their opposite ends to a stationary contact 118 and movable contact 119, respectively, of the thermal switch 31—electrical communication is established between the contacts 117 by means of the switch bar 121 operated by the controller 28.

The pilot switch 112 in its neutral position, as shown in Figure 1, prevents the operation of the motor 11—that is, in this position the circuit in which a solenoid 106 is connected is broken and, accordingly, the switch 107 is held open by a spring 120.

When the switch 112 is moved into the right hand position, as viewed in Figure 1, contact is established between leads 114 and 113 and in this position, the dual automatic control comes into operation. Specifically, closing of either the thermal actuated switch 31 or the pressure actuated switch 29 completes the circuit-leads 110 and 114—in which the solenoid 106 is connected and the solenoid is energized to close the switch 107 thereby completing the circuit in which the motor 11 is connected. When both of the switches 29 and 31 are open, the solenoid 106 is de-energized and the switch 107 is biased into its open position by the spring 120 and the motor 11 stops.

The pilot switch 112, in its third, or past position—to the left as viewed in Figure 1—completes the electrical circuit in which the solenoid 106 is connected and, accordingly, the motor runs at constant speed regardless of the position of switches 31 and 29.

Reviewing briefly the operation of the dual automatic control, it will be assumed that the pilot control switch is in the dual control position, or right hand position as viewed in Figure 1, and, for example, that a compressor rated at 100 cubic feet per minute is driven by an electric motor having a cross-over point, in time, of three minutes. In other words, the cost of operating the unit unloaded for three minutes is equal to the cost of bringing the unit up to speed from stand still. With a receiver volume of 96 cubic feet, the cross-over point, measured in percentage of load demand, at which it is more economical to operate at constant speed will be about 26%.

It will be further assumed that the controller 28 is set to operate at its upper limit at a receiver pressure of 100 pounds per square inch and reverse action will occur at 80 p. s. i. Also, it will be assumed that when the compressor is operating at or near 26% of full demand that the temperature range, or heating and cooling cycle of the cylinder 21, will be between 261° F. and 236° F. That is, at this demand, the temperature of the high pressure cylinder 21 at the bulb 34 will exceed, slightly, 260° F. when the receiver pressure reaches 100 p. s. i., and when the compressor is running unloaded, the pressure within the receiver 24 will fall to 80 p. s. i. before the temperature of the compressor at the aforesaid point drops to 235° F. Accordingly, the thermal switch will be adjusted to close at 260° and to open at 235°.

Under these conditions, assumed by the way of example, the compressor 10 will, whenever the load demand exceeds 26%, operate at constant speed. Specifically, when the compressor is operating loaded, the cylinder head temperature will rise to 260° F. before the receiver pressure rises to 100 lbs. At a cylinder temperature of 260° F. the thermal actuated switch 31 will be closed thereby holding the electrical switch 107 in a closed position in the manner previously described. When the pressure within the receiver 24 reaches 100 p. s. i., the force exerted on the bottom of the diaphragm 41, as viewed in Figure 2, will overcome the force of the spring 38 to move the switch bar 121 thereby breaking the electrical connection between the contacts 117. This opening of the circuit does not, however, stop the motor 11 inasmuch as the temperature switch, in the closed position, prevents the control of the operation of the motor 11 by the controller 28.

Simultaneously with the opening of the switch 29, the controller actuates the release valve 36 to valve pressure fluid to the three-way valve 49 which, in turn, valves pressure fluid to the valves 25 to unload the low pressure cylinders 16. The high pressure relief valve 27 and the intercooler relief valve 26 will, of course, in response to this change in pressure condition within the system, automatically unload the high pressure cylinder and the intercooler, respectively.

The compressor 10 will then operate unloaded until the pressure within the receiver falls to 80 p. s. i.—at this pressure the temperature of the cylinder 21 exceeds 235° F. and the temperature actuated switch 31 remains closed—at which pressure value the plunger 46 will move to its lower limiting position thereby snapping the electrical switch 29 closed and actuating the release valve 36 to exhaust the three-way valve 49 which, in turn, exhausts pressure fluid from the unloader valves 25 to load the low pressure cylinders 16. With the loading of the low pressure cylinders, the intercooler relief valve 26 and the high pressure relief valve 27 will automatically close thereby fully loading the compressor 10. This is "constant-speed" control.

This cycle of operation will continue until such time as the air demand falls below 26% of the total capacity of the compressor. When this occurs, the temperature of the high pressure cylinder 21 adjacent the bulb 34 will drop below 235° before the pressure within the receiver 24 has dropped to 80 p. s. i. When the temperature drops to 235°, the thermal switch 31 will open to shut down the motor 11—that is, the controller 28 will have on the previous cycle opened the electrical switch 29 in the manner aforesaid and, accordingly, when the thermal switch 31 is opened, the circuit in which the solenoid 106 is connected will be opened thereby opening the switch 107 to shut down the motor 11.

Thereafter the pressure within the receiver will fall to 80 p. s. i. and the controller 28 will be actuated to load the compressor 10. However, in this instance, the closing of the electrical switch 29 by the controller 28 will start the motor 11. As long as the load demand is below 26%, the temperature of the high pressure cylinder will not reach 260° and, accordingly, the thermal switch 31 will remain open and the control of the motor 11 will be dependent entirely on the setting of the controller 28, or in other words, the controller 28 will unload the compressor and shut off the motor 11 when the pressure within the receiver 24 reaches 100 p. s. i., and will start the motor 11 and load the compressor whenever pressure within the receiver drops to 80 p. s. i. This is "start-stop" control.

The upper and lower temperature limits at which the thermal switch 31 is actuated will, of course, vary considerably in accordance with the pressure system to which it is adapted. That is, the upper and lower temperature limits of the compressor will vary in accordance with the type of compressor and mode of cooling—e. g., the temperature variation, or heating and cooling cycle, of a water cooled compressor will be somewhat less than the temperature change of an air cooled compressor under similar load conditions.

The dual automatic control is, however, readily adapted to any compressor system so as to attain an entirely automatic means for selecting the most efficient mode of controlling the output of the compressor for a given condition. For any given motor, as was previously mentioned, there is a crossover point at which it is more economical to start and stop the motor than to run it continuously.

This time may be readily computed by the substitution of known, or readily determinable, quantities in the Equation A following.

(A) $$t = \frac{60Sk}{E}$$

$E =$ Kilowatts required to produce the rated capacity of the compressor in cubic feet per minute.
$S =$ Kilowatts required to accelerate the motor from no speed to rated speed.
$k =$ A constant (between 5 and 7) equal to E divided by the kw. required to drive the compressor unloaded.
$t =$ Time which the motor can drive the unloaded compressor at constant speed for a cost equal to the cost of accelerating the motor from no speed to rated speed.

When this time is determined, it is then merely necessary to determine the percentage demand on the compressor at which this crossover point occurs and the upper and lower temperature values of the compressor at this demand for a given upper and lower pressure setting for the controller 28.

The latter is determined for any one type of compressor by test, the former by the following Equation B.

(B) $$x = \frac{\left(\frac{P_2 - P_1}{P_o}\right)V}{t}$$

$x =$ Demand on the compressor in cubic feet per minute when the cost of running "start-stop" is equal to the cost of running at "constant-speed."
$P_2 =$ Upper value of the discharge pressure.
$P_1 =$ Lower value of the discharge pressure.
$P_o =$ Atmospheric pressure.
$V =$ Receiver volume in cubic feet.

The thermal switch 31 is then set with upper and lower temperature limits in accordance with the factors determined in the manner set forth.

In view of the foregoing disclosure, it is clear that a dual automatic control for a compressor constructed in accordance with the practice of the invention accomplishes, among others, the objects hereinbefore set forth and, further, due to its simplicity, is capable of prolonged and efficient operation with a minimum of attention. It is also to be noted that the control may be adapted to any compressor system so as to obtain the more efficient mode of load control, in accordance with the percentage demand, or temperature of the compressor, for any given system.

While I have shown and described a specific form of my invention, it is to be understood that various changes and modifications may be made without departing from the spirit of the invention as set forth in the appended claims.

I claim:

1. A dual automatic control adapted to be connected to a gas compressor driven by an electric motor, comprising a controller for connection to the discharge of the compressor and acting in response to a predetermined upper discharge pressure of the compressor for unloading the compressor and acting at a predetermined lower discharge pressure for loading the compressor, an electrical switch for operative connection to the controller for controlling the operation of said motor by making and breaking the electrical circuit in which said motor is connected and being actuated by said controller to open and break the circuit when the pressure reaches said upper predetermined pressure and to close and make the circuit when the pressure reaches said predetermined lower value, an electrical switch for connection in parallel with the first said switch, and means adapted to be mounted in thermal contact with the compressor and responsive to the temperature of the compressor for opening and closing the second said switch.

2. The combination of a compressor, a motor for driving the compressor, means connected to said compressor for loading and unloading the compressor at predetermined discharge pressures thereof, means operatively associated with the first said means for starting and stopping said motor at predetermined discharge pressures of the compressor, and temperature responsive means connected to the compressor and acting in accordance with the percentage demand on the compressor for preventing the control of the motor by the second said means whenever said percentage exceeds a predetermined value.

3. A dual automatic control for connection to a gas compressor unit including a compressor element driven by a motor element, comprising means adapted to be connected to the compressor for loading the compressor at a predetermined lower discharge pressure of the compressor element and for unloading the compressor element at a predetermined upper discharge pressure, means for adaption to the first said means for starting the motor element at said lower discharge pressure and for stopping the motor element at said upper discharge pressure, and means adapted to be thermally associated with one of said elements acting responsively to a predetermined upper temperature value thereof for preventing the second said means from shutting down the motor element and acting at a predetermined lower temperature for permitting control of the motor element by the second said means.

4. The combination of a gas compressor, a motor for driving the compressor, means connected to the compressor discharge for loading the compressor at a predetermined lower discharge pressure of the compressor and for unloading the compressor at a predetermined upper discharge pressure, means operatively associated with the controller for starting the motor at said lower discharge pressure and for stopping the motor at said upper discharge pressure, and means operatively connected with the second said means and acting responsively to a predetermined upper temperature value of the compressor for preventing the second said means from shutting down the motor and acting at a predetermined lower temperature of the compressor for permitting control of the motor by the second said means.

5. In combination with a gas compressor unit including a compressor driven by an electric motor, a dual automatic control comprising a controller in communication with the compressor discharge and acting at a predetermined upper discharge pressure of the compressor for unloading the compressor and acting at a lower discharge pressure for loading the compressor, an electrical switch for controlling the flow of power to said motor and operatively associated with and actuated by said controller to open said switch and cut off the flow of power to the motor at said upper pressure and to close said switch at said lower pressure, an electrical switch connected in parallel with the first said switch for controlling the flow of power thereto, means for operating the second said switch, and means adapted to said unit and connected to the first said means and acting in response to a predetermined upper temperature value of said unit to actuate the first said means for closing the second said switch and acting at a predetermined lower temperature value to actuate the first said means for opening the second said switch.

6. The combination with a gas compressor and a motor for driving the compressor, of means in communication with the discharge of the compressor and actuated in response to variations in discharge pressure of the compressor for loading and unloading the compressor at predetermined lower and upper discharge pressures thereof and for starting and stopping the motor at said lower and upper discharge pressures, means operatively associated with the first said means for controlling the starting and stopping of the motor by the first said means, and thermoresponsive means mounted in thermal contact with said compressor and connected to the second said means for actuating the second said means in response to temperature variations of the compressor and being arranged to actuate the second said means at a predetermined upper temperature of the compressor to prevent stopping of the motor by the first said means.

7. The combination with a gas compressor unit, of means in communication with the discharge of the compressor and responsive to variations in pressures of the discharge for loading and unloading the compressor at predetermined lower and upper discharge pressures thereof and for simultaneously starting and stopping said unit at said lower and upper pressures, means operatively associated with the first said means and cooperating therewith for controlling the starting and stopping of said unit, a thermometer mounted in thermal contact with said unit and operatively associated with the second said means for actuating the second said means in response to variations in temperature of said unit and being arranged to actuate the second said means at a predetermined upper temperature of the compressor to prevent stopping of the motor by the first said means.

8. The combination with a compressor and a motor for driving the compressor, of a controller in communication with the discharge of the compressor and acting in response to a predetermined upper discharge pressure of the compressor for unloading the compressor and acting at a predetermined lower discharge pressure for loading the compressor, means adapted to said controller and actuated thereby for controlling the flow of power to the motor, means operatively connected to the first said means for controlling the flow of power to said motor independently of the control of the first said means, means adapted to the second said means for actuating the second said means, and a thermometer mounted in thermal relation with said compressor and responsive to variations in temperature thereof for actuating the last said means.

9. The combination of a compressor having a cylinder, a motor for driving the compressor, a controller in communication with the discharge of the compressor and acting at a predetermined upper discharge of the compressor for unloading the compressor and acting at a lower discharge pressure for loading the compressor, a switch adapted to said controller and actuated thereby for controlling the flow of power to said motor, said switch being actuated by the controller at said upper pressure for cutting off the flow of power to the motor and acting at said lower predetermined pressure to communicate the motor with the source of power, a second switch connected to the first said switch for controlling the flow of power to said motor, means for actuating the second said switch, and a thermometer mounted in thermal contact with said cylinder and acting in response to variations in temperature of said cylinder for actuating said means, said means being actuated at a predetermined upper temperature value of the compressor to actuate the second said switch to supply power to the motor independently of the control of the first said switch.

10. The combination of a gas compressor element, a motor element the temperature of which varies with variations in load thereon connected to drive the compressor, a power supply line for the motor element, a controller in communication with the discharge of the compressor element and connected in the power supply line of the motor element for starting and stopping the motor element at predetermined lower and upper discharge pressure of the compressor element, means connected in the power supply line for controlling the flow of power to the motor element, and a thermometer connected to said means and mounted in thermal contact with one of said elements and acting responsively to variations in temperature thereof for actuating said means to supply power to the motor element independently of the control of said controller whenever the temperature of the element with which the thermometer is in contact exceeds a predetermined upper value.

PAUL A. BANCEL.

References Cited in the file of this patent

UNITED STATES PATENTS

| Number | Name | Date |
|---|---|---|
| 1,829,593 | Henning | Oct. 27, 1931 |
| 1,863,851 | Hughes | June 21, 1932 |
| 2,345,797 | Corson | Apr. 4, 1944 |
| 2,516,291 | Bartholomew | July 25, 1950 |

FOREIGN PATENTS

| Number | Country | Date |
|---|---|---|
| 505,391 | Great Britain | May 10, 1939 |